April 16, 1968 H. VITT 3,378,817

SIGNALLING SYSTEMS

Filed Dec. 9, 1964 5 Sheets-Sheet 1

INVENTOR.
HILLERT VITT
BY Joseph V. Claeys
HIS ATTORNEY

SIGNALLING SYSTEMS

Filed Dec. 9, 1964 5 Sheets-Sheet 2

| FUNCTION | TONES | UTILIZATION DEVICE |
|---|---|---|
| THROTTLE ON | 1 & 2 | 1 |
| THROTTLE OFF | 1 & 3 | 2 |
| BRAKE OFF | 1 & 4 | 3 |
| REVERSE | 1 & 5 | 4 |
| BRAKE ON | 3 & 4 | 5 |
| SAND | 2 & 4 | 6 |
| UNCOUPLE #2 | 2 & 5 | 7 |
| BELL | 2 & 3 | 8 |
| FORWARD | 3 & 5 | 9 |
| UNCOUPLE #1 | 4 & 5 | 10 |

INVENTOR.
HILLERT VITT
BY Joseph V. Claeys
HIS ATTORNEY

April 16, 1968 H. VITT 3,378,817

SIGNALLING SYSTEMS

Filed Dec. 9, 1964 5 Sheets-Sheet 3

INVENTOR.
HILLERT VITT
BY Joseph V. Claeys
HIS ATTORNEY

INVENTOR.
HILLERT VITT
BY Joseph V. Claeys
HIS ATTORNEY

April 16, 1968 H. VITT 3,378,817

SIGNALLING SYSTEMS

Filed Dec. 9, 1964 5 Sheets-Sheet 5

INVENTOR.
HILLERT VITT
BY Joseph V. Claeys
HIS ATTORNEY

United States Patent Office 3,378,817
Patented Apr. 16, 1968

3,378,817
SIGNALLING SYSTEMS
Hillert Vitt, Erie, Pa., assignor to General Electric Company, a corporation of New York
Filed Dec. 9, 1964, Ser. No. 417,151
13 Claims. (Cl. 340—171)

This invention relates to signalling systems and more particularly to such systems for providing for the selective control of a plurality of separate utilization means or devices. While this invention is subject to a wide range of applications, it is especially suited for the remote control of moving craft or vehicles, particularly railway vehicles such as locomotives, and will be described in detail in that connection.

Systems have been known previously for remotely controlling vehicles and the advantages achieved thereby are manifest. For example, remotely controlling a switching locomotive promotes economy since a single individual is thus capable of controlling the operation of the vehicle as well as operating switches and other related equipment. Moreover, it is often desirable in certain industrial operations to provide for the remote control of a vehicle so that a single operator may control vehicle operation in hazadrous environments, such as extremely high temperatures, high levels of nuclear rediation or the like, as well as controlling other equipment.

Remote control signalling systems for controlling the operation of vehicles have been known, for example, which employ a suitably modulated transmitter and an appropriate receiver; the transmitter carrier being modulated with a suitable sub-carrier frequency, or tone signal, to provide a desired control function. Usually, in order to obtain a sufficient number of control functions, the transmitter carrier is modulated with two or more tone signals simultaneously. In such a system, therefore, a plurality of tones are superimposed on each other and are transmitted simultaneously as a composite signal. Thus, the total power in the composite signal must be distributed among the number of frequencies consisting the signal. Moreover, in such a system, loss of any component of the composite signal, due to selective fading or other atmospheric effects, results in an erroneous reception. Accordingly, such prior art simultaneous type systems have not been entirely satisfactory especially when it is desired, or required, to obtain the strongest possible signal within a limited available bandwidth. For example, for many applications it is a distinct advantage, if not a necessity, to operate on a narrow band. Thus, for some applications where the only frequency allocation available may be of a narrow band, dependable operation of the remote control system within such a narrow band is absolutely necessary.

It is an object of this invention, therefore, to provide a remote control signalling system which substantially overcomes one or more of the prior art disadvantages.

It is another object of this invention to provide a signalling system for controlling a plurality of separate utilization devices.

It is a further object of this invention to provide a signalling system which is arranged to "fail safe" due to a system fault as well as any loss of active control by the operator, such as could result from some mishap to him.

It is a still further object of this invention to provide a signalling system for controlling a plurality of separate utilization means in response to separate function command signals each composed of a plurality of distinctive single frequencies, or tone signals, transmitted one after the other in a particular timed relationship.

Briefly stated, in accordance with one aspect of this invention, the signalling system comprises means for transmitting function command signals each of which is operative to cause actuation of a particular one of a plurality of separate utilization devices. Each of the function command signals is composed of a safety tone signal and a given number of successive distinctive control tones in a predetermined timed relationship therewith. The system also includes receiver means for receiving the function command signals. At the receiving station, means are also provided for decoding the received function command signals so that output means are actuated in accordance with the tone signals making up a given function command signal. Means are further provided which are arranged to cause a preselected one of the utilization devices to be actuated when a preselected combination of output means actuated to their energized condition in a predetermined timed sequence from reception of a safety tone and a preselected combination of distinctive control tone signals in a manner adapted to assure that for some predetermined time period the energized conditions of all of the preselected combination of output means are present simultaneously.

The novel features believed characteristic of this invention are set forth with particularity in the appended claims. My invention itself, however, both as its organization and method of operation, together with further objects and advantages thereof, may best be understood by reference to the following description taken in conjunction with the accompanying drawing in which:

Figures 3, 4, 4A:
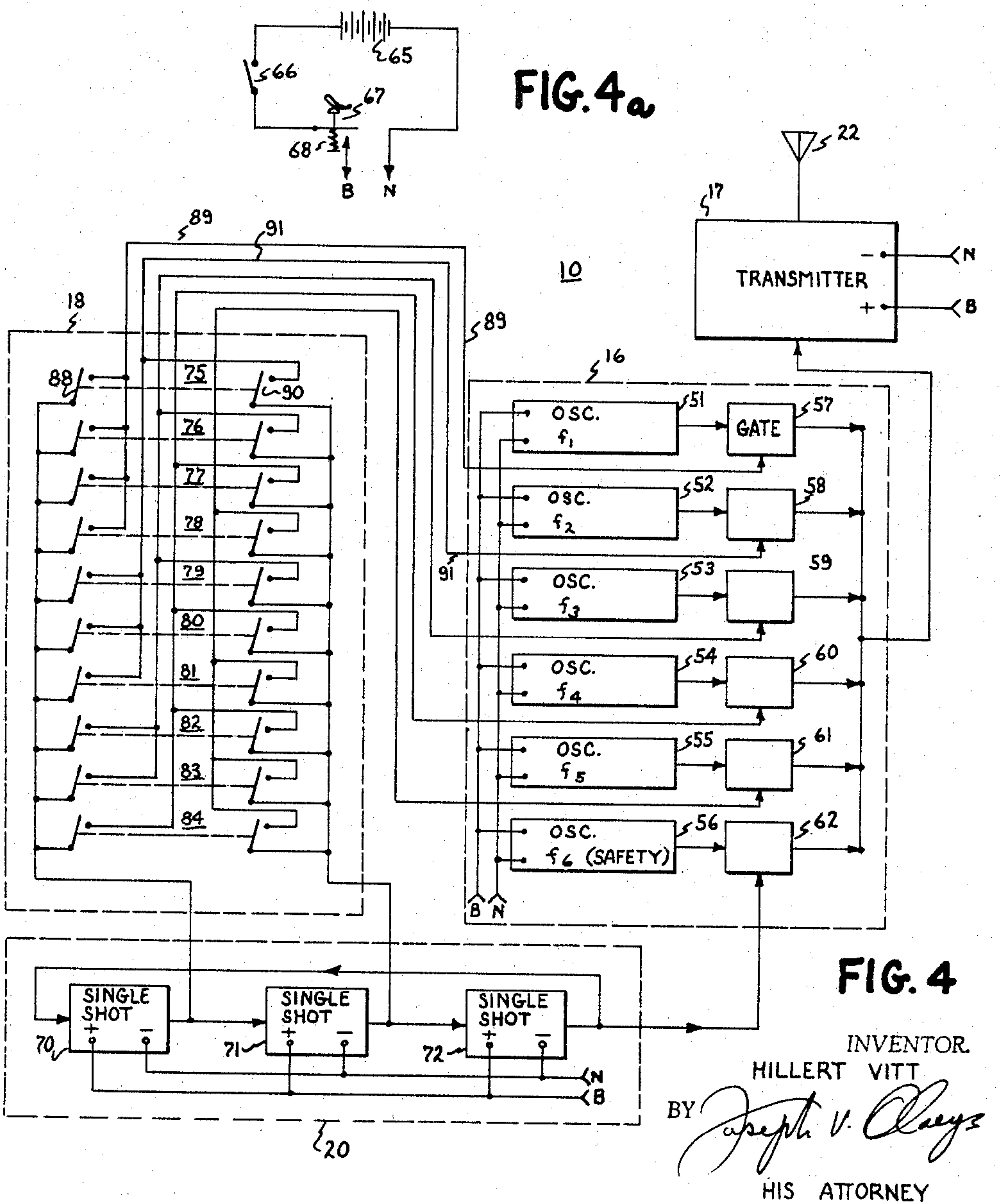
FIGURE 3 is a tabulation showing the various control functions, combination of control tones and the utilization device actuated to provide that function.
FIGURE 4 is a more detailed block diagram of a specific arrangement of apparatus for use at the operator's station.
Figure 5:
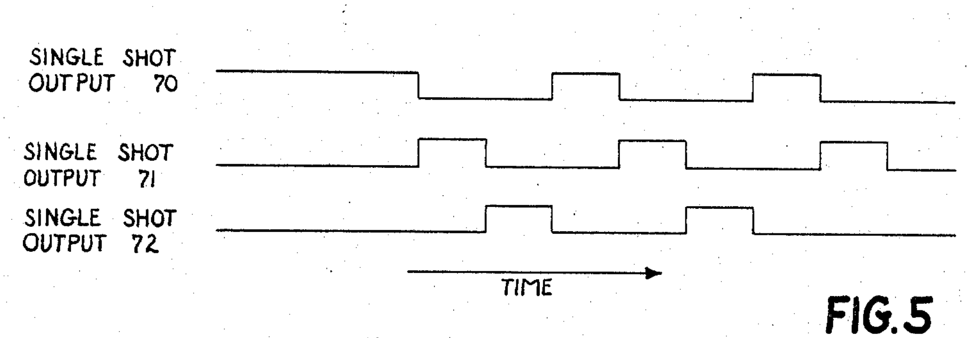
Figure 7:
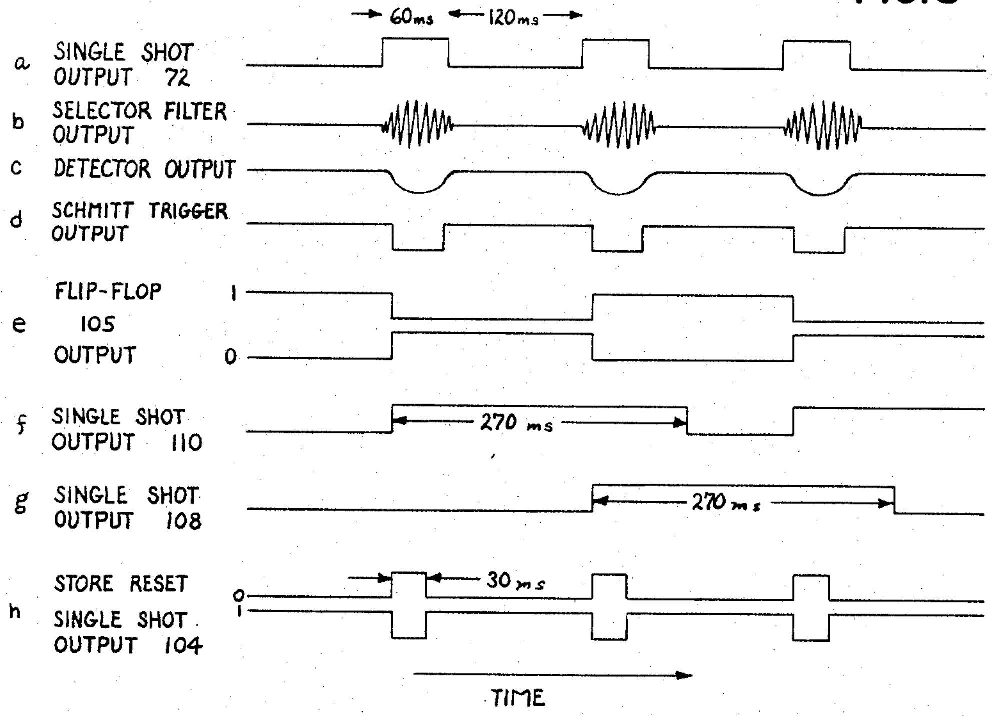
Figure 6:
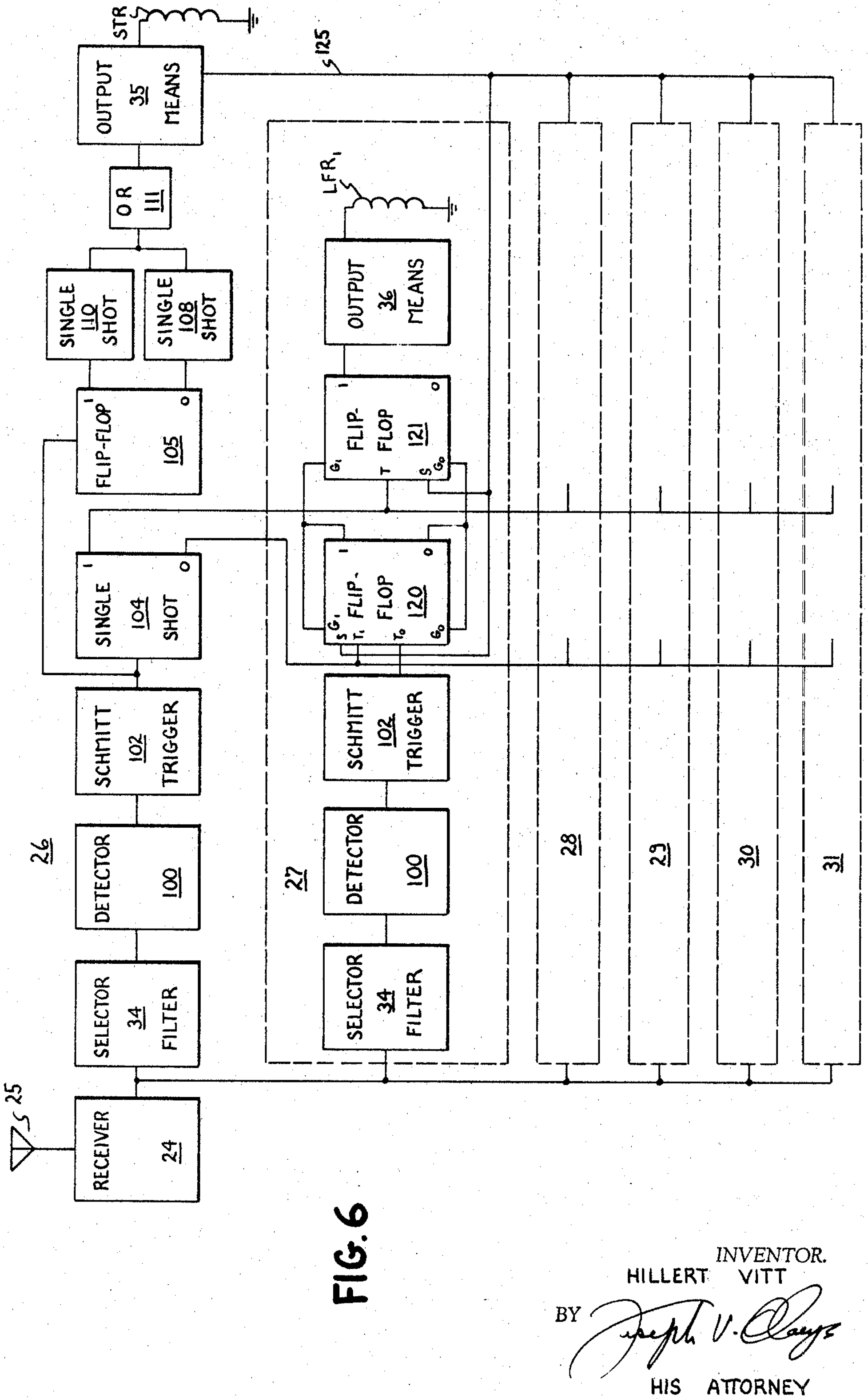
Figure 8:
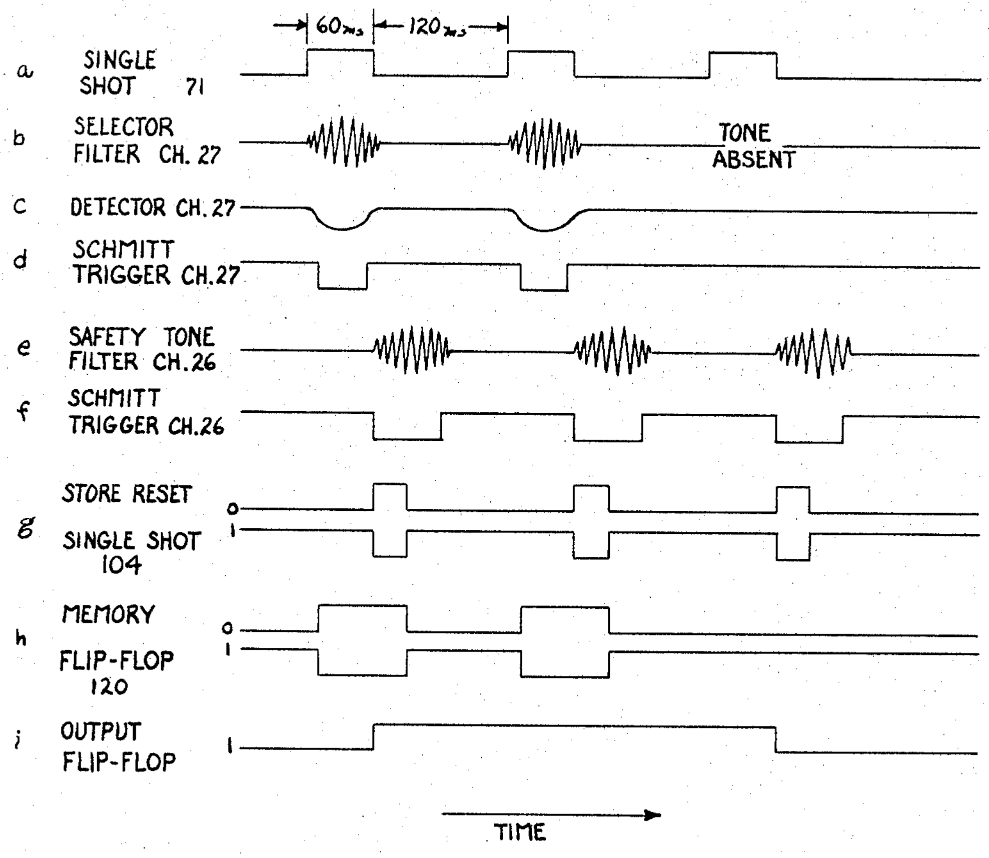

FIGURE *4a* is a simplified schematic diagram of a suitable power supply arrangement for energizing the operator station apparatus;

FIGURE 5 is a timing diagram showing the relationship of the outputs of the timing circuit of FIGURE 4;

FIGURE 6 is a more detailed block diagram of an embodiment of suitable remote station apparatus; and, FIGURES 7 and 8 are timing diagrams useful in explaining the operation of the safety channel and control channels respectively of FIGURE 6.

Figures 1, 2:
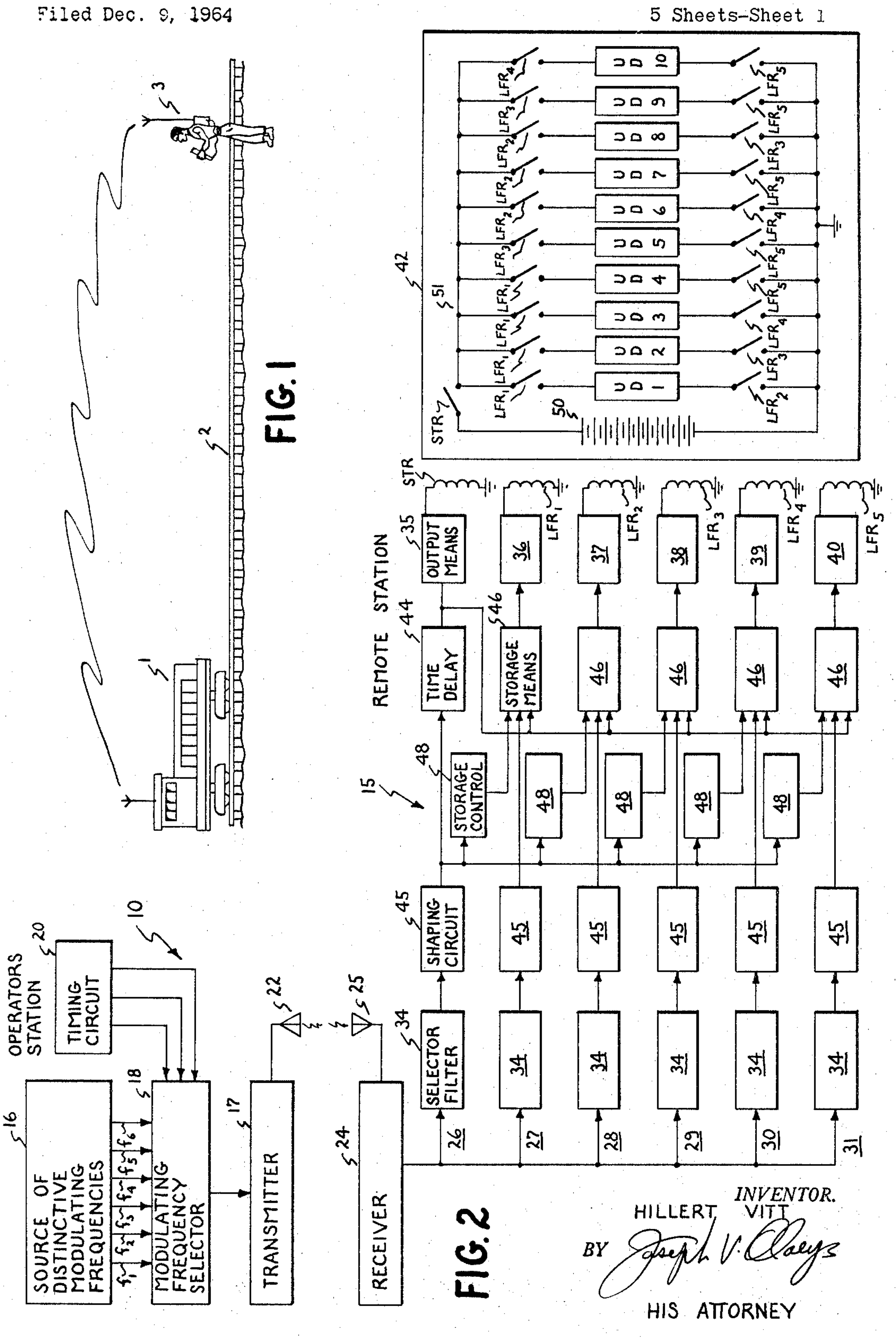
FIGURE 1 represents a locomotive adapted to be remotely operated and which is equipped with the apparatus provided in accordance with this invention.
FIGURE 2 is a simplified block diagram representation of the basic signalling system of this invention showing the arrangement of the apparatus at the operator's station and the remote station.

Referring to FIGURES 1 and 2, the signalling system of this invention is shown employed to provide for the complete remote operation of a vehicle, such as the locomotive 1. As shown, locomotive 1 is adapted to be operated on the track 2 under the control of an operator 3 adjacent the track. Although shown adjacent track 2, it will be understood that operator 3 may be located in a control tower, or any other suitable station from which operation of the vehicle may be observed.

The communication link between the operator and the vehicle is shown as being provided by space radio. Again, it will be understood that inductive carrier ("wired radio"), or any other suitable communication system may be employed. Preferably, a frequency modulation system is employed wherein the operator is provided with a self-powered, portable frequency modulated transmitter and the vehicle with a suitable frequency modulated receiver. Control information is transmitted from the operator's station to the vehicle by a combination of distinctive signals, such as audio tones, which are arranged to modulate the transmitter carrier frequency one at a time in a particular timed sequence.

In the specific embodiment of the invention described in detail herein, six separate audio tones designated $f_1$–$f_6$ are provided. Three audio tones must modulate the carrier frequency one at a time in a timed sequence to form a function command signal which, when received and operated upon by the vehicle-carried apparatus, actuates the desired utilization device to obtain a desired function such as throttle, sand, start etc. One of the audio tones making up any function command signal is a "safety tone" which must be present to permit any control function to be performed. Simply, this safety tone may be viewed as acting in much the same way as the so-called "dead-man" function conventionally employed on manually controlled vehicles such as locomotives. The other two tones making up a function command signal, are selected from the remaining five and, in combination with the safety tone, provide the specific function command signal. It will be readily apparent, therefore, that the six audio tones are capable of providing ten function command signals each identified with a specific vehicle function to be performed. That is, there are ten combinations of the five tones, taken two at a time, which can be used, in combination with the common safety tone, to select as many different control functions. If more than ten different functions are required for any particular application, they may be readily provided by making additional modulating frequencies available. For example, the addition of one more modulating frequency will provide for five more function command signals or a total of fifteen rather than ten.

As shown in FIGURES 1 and 2, operator 3 is provided with portable transmitter and function selector apparatus, designated generally as 10. The operator's station apparatus 10 comprises two portions one portion which is arranged to be hand-carried. This arrangement provides a convenient means of establishing "fail safe" operation in the event of some mishap to the operator whereby, for one reason or another, he loses active control. To this end, the hand-carried portion may be provided with a palm switch in a pistol grip type handle. The apparatus is so arranged that the palm switch must be in its depressed condition before any function command signals can be generated by the apparatus to cause vehicle operation.

Referring now to FIGURE 2, there is shown a very simplified block diagram representation of the signalling system of this invention comprising the operator's station apparatus 10 and the remote station apparatus 15. The operator's station apparatus 10 comprises a source of distinctive modulating frequencies 16, which may be, for example, a plurality of separate sub-carrier frequency oscillators, a master oscillator provided with a suitable number of electronic switches arranged to switch different tank circuits into the master oscillator circuit, or other suitable means of providing the desired frequencies. The apparatus also includes a source of carrier frequency oscillations, shown as the transmitter 17, a modulating frequency or function selector 18 and a timing circuit 20. One of the modulating frequencies, for example $f_6$, is preselected as the "safety tone" and is arranged to be employed as one of the modulating frequencies of any given function command signal. That is, this "safety tone" modulating frequency is common to all of the function command signals which are made up of a "safety tone" and two "control tones."

The timing circuit 20 is arranged so that the "safety tone," and the other modulating frequencies, or control tones, selected in selector 18 for the desired function, are caused to modulate the carrier frequency of transmitter 17 one at a time in a particular timed sequence. The carrier frequency, so modulated, is emitted through the transmitter antenna system 22.

The apparatus 15 at the remote station is arranged to collect, select and translate the function command signals transmitted from the operator's station into specific electric signals which are operative to initiate the operating functions of the vehicle. To this end, the remote station is provided with a receiver 24 which picks up the energy from the transmitted carrier frequency on its antenna system 25. Receiver 24 may be of any suitable type and is arranged to provide the modulating frequencies at its output in well-known manner. For example, for a frequency modulated radio communication system, receiver 24 would include an input filter which passes only the desired frequencies which are then amplified, limited and fed to a discriminator where the modulating frequencies are recovered to provide an audio output if audio tones were employed as the modulating frequencies.

The output of receiver 24 is connected to a number of separate channels corresponding to the number of modulating frequencies employed. For example, for the specific embodiment of the invention described herein employing six audio modulating frequencies six separate channels 26, 27, 28, 29, 30 and 31 are provided. Channel 26 is designated the "safety tone" channel with the remaining channels designated as "control tone" channels. As described hereinbefore, a function command signal is made up of a "safety tone" and two "control tones" in a particular timed relationship one-to-the-other which timing is controlled by the timing circuit 20 at the operator's station.

The output of receiver 24 is connected to the six separate channels 26–31. With the exception of safety tone channel 26 all the other channels 27–31 are similar. Accordingly, only the safety tone channel 26 and one of the remaining channels, specifically channel 27, will be described in complete detail.

The output of receiver 24 is connected to a frequency selective means, shown as selector filters 34 in each of the channels 26–31. The selector filter 34 in channel 26 is adapted to pass only the modulating frequency designated as the "safety tone." Similarly, the selector filters in each of the other channels are adapted to pass a different one of the remaining five modulating frequencies or control tones. The modulating frequencies from receiver 24, therefore, are directed through one of the separate channels 26–31 in accordance with the received modulating frequency. For example, the safety tone modulating frequency is directed only through safety tone channel 26 since that is the only channel whose selector filter will pass that frequency. The same is true for the remaining modulating frequency tones and their respective control tone channels. Each of the separate channels is provided with an output means designated generally by the reference numerals 35–40. As shown, the output means 35 of safety tone channel 26 is arranged to actuate a safety tone relay STR. Similarly, the remaining output means 36–40 are arranged to actuate a locomotive function relay designated $LFR_1$–$LFR_5$; the subscripts corresponding to the five control modulating frequencies, or audio tones $f_1$–$f_5$.

Although output means 35–40 are shown for convenience as being arranged to actuate the safety tone and locomotive function relays, respectively, it will be understood that the locomotive function relays and safety tone relay could themselves be the output means. The use of sensitive relays or other output means to control the function relays is widely used in the art and is advantageous for a variety of applications.

The remote station is also provided with separate utilization devices, designated generally as $UD_1$–$UD_{10}$ each adapted, when actuated to perform a specific function. For example, as arranged in FIGURE 2, $UD_1$ provides the THROTTLE ON function while $UD_8$ provides for operating the bell. The particular arrangement is, of course, a matter of choice. The utilization devices $UD_1$–$UD_{10}$ are shown included in the control means 42 suitably arranged with the STR and $LFR_1$–$LFR_5$ contacts. The contacts of the relays $LFR_1$–$LFR_5$ may be arranged, as shown in FIGURE 2, for example, so that the specific utilization device, $UD_1$–$UD_{10}$, to initiate a particular operating function, can only be actuated when the energized condition is present at the output means of the safety tone channel and two of the remaining channels at the same time. Moreover, the simultaneous energized condition of the three output means should be maintained for a time long enough to complete the specific operating function.

As described hereinbefore, the function command signal emitted from the antenna system 22 at the operator's station is a sequentially modulated carrier frequency. That is, the transmitter carrier frequency is modulated by three separate frequencies one after the other in a timed relationship determined by the timing circuit 20. More specifically, for example, the carrier frequency is modulated for a given time period, say 60 milliseconds, by the safety tone modulating frequency then, for a similar time period immediately following, by one of the control tone modulating frequencies and finally for a similar 60-millisecond period by another of the control tone modulating frequencies to provide the complete function command tone.

Since the output means of the separate channels 26–31, however, are each selectively energized by a different one of the modulating frequencies, means are provided in such channels to allow for three output means of the separate channels 26–31 to be in their energized condition simultaneously for some minimum time period in order to actuate the selected utilization device. Moreover, means are provided to prevent any operating function from being initiated if, for any reason, the safety tone is not present.

To this end, the safety tone channel 26 is provided with a suitable time delay means 44 to assure that, in response to an output from the shaping circuit 45, the output means 35 remains in its energized condition for a predetermined maximum time period. Viewed in another way the energized condition of output means 35 is arranged to terminate within a fixed time period. If, within that fixed time period, another safety tone is passed by selector 34 of safety tone channel 26, output means 35 will remain energized, maintaining relay coil STR energized and STR contacts in the locomotive control means 42 actuated. If another safety tone is not passed by selector filter 34 of safety tone channel 26, within that fixed time period, indicating a failure of the safety tone transmission or other malfunction, then the energized condition of output means 35 terminates causing contacts STR to open and preventing initiation or continuance of any operating function.

In channel 27, and all the remaining control tone channels, the output of the shaping circuit 45 is applied to a storage means 46. Storage means 46 is arranged so that an input is required from a storage control means 48 and the extended safety tone output from time delay means 44 as well as from shaping circuit 45 in order to produce an output to energize its associated output means. The storage control 48 is operative, in response to the input thereto from the shaping circuit 45 of the safety tone channel 26, to so condition the storage means 46 that the output therefrom is maintained for a fixed time period as long as the signal from time delay 44 is present. Failure of the signal from time delay 44, indicating a loss of the safety tone, removes the output from the storage means 46. Thus, there is provided an additional safety to prevent initiation or continuation of an operating function if for any reason the safety tone is not present. As shown by the foregoing, the fixed time period during which the output from storage means 46 is maintained must be long enough to allow the output means of the two selected control tone channels 27–31 to be in their energized conditions simultaneously during some portion of the energized condition of the output means 35 of the safety tone channel 26. Also, this simultaneous energization period must be sufficiently long to allow actuation of the selected utilization device to be completed so as to provide the function selected by the operator.

For example, assume the operator desires the THROTTLE ON function to be performed and, by appropriate manipulation of selector 18 and depression of the palm switch in the hand-carried portion of the apparatus, has caused the safety tone and two command tones to modulate the transmitter 17. To better explain the following operation of the signalling system reference may be had to FIGURE 3 which tabulates the various functions, the combination of command tones and the utilization device required to be actuated to perform the function.

As shown hereinbefore, depression of the palm switch is operative to cause the safety tone to modulate the transmitter carrier frequency for a given time period determined by the timing circuit 20. Thus, for the THROTTLE ON function the operator would depress the palm switch and, by manipulation of a suitable switch on selector 18, cause the transmitter carrier frequency to be modulated by the safety tone, tone $F_1$ and tone $F_2$ one after the other for equal time periods determined and controlled by the timing circuit 20. This function command signal is then emitted through the transmitter antenna system 22 and is accepted by the receiver antenna system 25 at the remote station.

The signal is selected by receiver 24 and suitably demodulated to remove the carrier frequency. The demodulated signal is then decoded by directing it to the channels 26–31. Selector filter 34 in safety tone channel 26 passes the safety tone frequency and applies it to its shaping circuit 45. The output of the shaping circuit 45 in safety channel 26 is then applied to time delay means 44 the output of which causes output means 35 to remain in its energized condition for a fixed maximum time period. With output means 35 energized, relay STR is energized closing STR contacts and connecting the positive side of the control power supply, shown schematically as the battery 50, to the conductor 51.

Immediately following the cessation of the safety tone control tone $f_1$ is passed by the selector filter 34 in channel 27 and applied to the shaping circuit 45 therein. The output of shaping circuit 45 in control channel 27 is applied to one of the inputs of storage means 46. Storage means 46 has been conditioned by an output at another input thereof from storage control 48 which in turn has been operated by the output signal from the shaping circuit 45 of safety tone channel 26. Also, since the safety tone is still present at the output of time delay 44, a signal therefrom is also applied at the remaining input of storage means 46 and an output of a fixed time duration is produced. The output of storage means 46 is applied to the output means 36 of channel 27 to cause it to assume its energized condition, which energized condition is maintained as long as an output appears at storage means 46. With output means 36 in its energized condition locomotive function relay $LFR_1$ is actuated to actuate contacts $LFR_1$ in the control means 42.

Immediately following the end of tone $f_1$, tone $f_2$ appears at the output of receiver 24 and is passed by the selector filter 34 in channel 28, the output of filter 34 being applied to the shaping circuit 45 therein. In the same manner just described with respect to tone $F_1$ in channel 27, he operation of storage control means 48, in combination with the signal from time delay 44 and the output from shaping circuit 45, results in the energization of output means 37 from the output of storage means 46. With output means 37 energized, locomotive function relay $LFR_2$ is actuated to actuate contacts $LFR_2$ completing the circuit of utilization device 1 and, as shown in FIGURE 3, providing the THROTTLE ON function. Utilization device $UD_1$ remains actuated to continue this function as long as transmitter 17 continues to send a function command signal composed of this same combination of tones, that is the safety tones, $f_1$ and $f_2$.

Referring now to FIGURE 4, there is shown a more detailed block diagram of a specific arrangement of apparatus 10 for use at the operator's station. As shown therein, the means 16 for producing the separate modulating frequencies comprises a number of separate oscillators each having a gate circuit associated therewith, which, when enabled, allows the carrier frequency of the transmitter 17 to be modulated by the frequency of that specific oscillator.

More specifically, means 16 as shown includes the six separate audio oscillators 51–56 producing the tones $f_1$–$f_6$ respectively. Each oscillator has a gate circuit 57–62 associated therewith. Gate circuits 57–62 are enabled to allow the frequency of its associated oscillator to modulate transmitter 17, when the output of that oscillator and the output from one of the stages of timing circuit 20 are present as will be described in more detail hereinafter.

As shown in FIGURE 4*a*, the operator's apparatus 10 receives energy from the battery 65. Battery 65 is in a circuit with a master switch 66 and a palm switch 67 suitably arranged, such as by means of the spring 68 for example, to be biased to the open position as shown. With the master switch closed, depression of palm switch 67 is operative to connect the battery terminals to energize the terminals B and N respectively. Accordingly, when the letters B and N appear at other locations in FIGURE 4, they represent a connection to these terminals which, through palm switch 67 and master switch 66, connect to the positive and negative terminals of the battery 65.

Referring again to FIGURE 4, timing circuit 20 is shown as comprising thee single shot multivibrator 70, 71 and 72 connected in a ring. The power source, connected at the terminals B and N, provides triggering impulses to the single shot multivibrator 70. The output of single shot multivibrator 70 is applied to trigger the second single shot multivibrator 71. The output of single shot multivibrator 71 is applied to trigger the third single shot multivibrator 72, the output of which is applied to trigger the first single shot multivibrator 70. For the specific embodiment to be described in detail herein, the time duration of each of the single shot multivibrators 70, 71 and 72 will be assumed to be 60 milliseconds. The outputs of the multivibrators 70–72 are used, in a manner to be described in more detail, to cause the safety tone and the various control tones making up a function command signal to modulate the transmitter 17 in a particular timed relationship. The sequence of operation of the single shot multivibrators 70–72 is shown by the timing diagram in FIGURE 5.

The output of single shot 72, in addition to being connected to the input of single shot 70 to provide triggering thereof, is also connected directly to the gate circuit 62. As shown by the connection of all oscillators 51–56 to terminals B and N, all the oscillator circuits are energized and operational as long as the palm switch 67 is depressed. Accordingly, when the output pulse from single shot 72 is applied to gate 62, gate 62 is enabled and the safety tone $f_6$ from oscillator 56 is allowed to modulate transmitter 17 for the 60 millisecond period during which single shot 72 is on.

The outputs of the remaining single shots 70 and 71 are also applied to the remaining gate circuits 57–61 through the plurality of double pole switches 75–84 associated with the modulating frequency, or function, selector 18. As shown by way of example, double pole switch 75, when actuated, connects the output of single shot 70, through the switch arm 88 and conductor 89, to the gate 57 associated with audio tone oscillator 51. Also, the output of single shot 71 is connected through the switch arm 90 and conductor 91 to the gate 58 associated with the audio tone oscillator 52. Reference to FIGURE 3 shows that, since the actuation of switch 75 in selector 18 would cause the transmitter 17 to be modulated by the safety tone ($f_6$) and audio tones $f_1$ and $f_2$, the THROTTLE ON function would be provided. The application of the outputs of single shots 70 and 72 to the remaining gate circuits by selection of the various switches 75–84 may be traced in a similar manner and by reference to FIGURE 3, the function performed by actuation of any specific switch may be ascertained, if desired.

Referring now to FIGURE 6, there is shown a more detailed block diagram of an embodiment of the remote station apparatus 15. As indicated previously in the general description of FIGURE 2, the function of the safety channel 26 is different from that of the control tone channels 27–31. Accordingly, as in FIGURE 2, the block diagram of the safety channel 26 differs from the block diagrams of the remaining channels 27–31, only channel 27 of which is shown in complete detail.

As shown in FIGURE 6, the safety channel 26, and each of the control channels 27–31 include a selector filter 34, a detector 100 and Schmitt trigger 102. Safety channel 26 also includes a store-reset single shot multivibrator 104 and a flip-flop 105. The "zero" output of flip-flop 105 triggers a single shot multivibrator 108 and the "one" output therof triggers a single shot multivibrator 110. The outputs of single shot multivibrator 108 and 110 are applied through or circuit 111 to the output means 35.

The command tone channel 27, however, includes a storage means shown as made up of the two flip-flop circuits, a memory flip-flop 120 and an output flip-flop 121. The output of flip-flop 121 is applied to output means 36 causing it to assume its energized condition. Only the control channel 27 has been completely described since, as already stated, the remaining control channels 28–31 are similar.

The arrangement and operation of the safety tone channel may best be explained by reference to the timing diagram shown in FIGURE 7. When the safety tone frequency appears at the audio output of receiver 24, an output as shown at FIGURE 7*b* is obtained from selector filter 34. When detected and filtered this appears as shown at FIGURE 7*c* and is employed to drive the Schmitt trigger 102 which produces an output wave form as shown at FIGURE 7*d*.

The output trigger from Schmitt circuit 102 is employed to operate the store-reset single shot 104 and the flip-flop circuit 105. Flip-flop 105 is driven between its two stable states each time the Schmitt trigger circuit is activated. The flip-flop 105 in turn triggers one of the single shot multivibrators 108 and 110 on each of its outputs. Reference of the timing diagram shows that each time the "one" side of flip-flop 105 drops, single shot 110 is triggered while the "zero" side thereof triggers single shot 108 each time its voltage output falls.

Conveniently, single shot multivibrators 108 and 110 are adapted to maintain their stable state for about 150% of the duration of the time for the timing circuit 20 to complete one complete cycle. This provides substantial overlap and freedom from critical timing. One of the single shots, 108 or 110, must be in its triggered state to allow vehicle operation to continue. The outputs are combined in the OR circuit 111 to energize the output means 35 of safety channel 26. As shown previously, output means 35 must be in an energized condition in order for any vehicle operating function to be performed.

The store-reset single shot 104 is operated by the output of the shaper circuit 45 of safety channel 26 and, although it has no function in the safety channel, the output thereof is employed to control the memory flips-flops 120 in the control tone channels 27–31. The specific function of store-reset single shot 104 will become apparent in the following description of operation of the control tone channel 27.

The operation of the control tone channel 27 may best be explained by reference to the timing diagram of FIGURE 8. The operation of the selector filter 34, detector 100 and Schmitt trigger 102 upon application of tone $f_1$ to channel 27 is the same as just described for safety channel 26. In channel 27, however, the output of Schmitt trigger 102 is applied to the $T_0$ terminal of memory flip-flop 120 triggering it to its active state. With memory flip-flop 120 actuated, the control gates $G_1$ and $G_0$ of the output flip-flop 121 are set to permit the output of the store-reset single shot 104 to trigger output flip-flop 121 to its active state as shown at FIGURE 8*i*. When the store-reset single shot 104 returns to its stable state, memory flip-flop 120 is triggered to its inactive state.

When the control tone is no longer present, as shown by the third time period in FIGURE 8*b*, the trigger pulse to set memory flip-flop 120 to its active state is absent so that memory flip-flop 120 remains in its inactive state to which it was triggered by the last trigger pulse from store-reset single shot 104. The control gates $G_1$ and $G_0$ of output flip-flop 121 are now set to permit the output of store-reset single shot 104 to trigger output flip-flop 121 to its inactive state as shown in FIGURE 8*i*.

In the safety tone channel 26, therefore, the output of Schmitt circuit 102 drives the flip-flop 105 which in turn triggers the single shot multivibrators 108 and 110 that keep output means 35 energized through the OR circuit 111. In the control channels 27–31, however, the output of Schmitt circuit 102 drives the memory flip-flop 120 from which the information is shifted to another flip-flop 121 that causes the output means of that channel to be energized. The reset pulse for the storage or memory flip-flop 120 and the shift pulse for the output flip-flop are provided by the store-reset single shot 104 which is driven by the output of the Schmitt circuit of the safety channel 26. Accordingly, it can be seen that memory flip-flop 120 is alternately "set" and "reset" as long as a specific tone is desired while the output flip-flop 121 only changes state when the output means of that control channel is to be energized or de-energized.

The output of flip-flop 121 energizes output means 36 which in turn is shown operating the locomotive function relay $LFR_1$. As already shown, two LFR relays in addition to the STR relay must be actuated in order to provide a locomotive function. Since the details of this have been described in complete detail in the description of FIGURE 2 it will not be repeated here. It will be apparent that the timing diagram for the second control tone would be the same as that shown in FIGURE 8 except of course that the second tone would modulate the transmitter carrier frequency during the time that single shot 70 of timing circuit 20 (FIGURE 4) is in its unstable state.

The memory flip-flops 120 and output flip-flops 121 in all of the control channels 27–31 are reset to the inactive state when the safety channel output means 35 is de-energized since the signal from output means 35 on conductor 125 will no longer be applied to the set terminals S of memory flip-flops 120 and output flip-flops 121 associated with each of the control channels.

For clarity and simplicity in explaining the concept, principle and method of operation of the present invention, much of the description has been related to function command signals composed of a safety tone and a selected combination of control tones. The invention contemplates also, however, permutations as well as combinations of control tones to make up a given function command signal. Moreover, for some applications a function command signal composed of a safety tone and a single control tone may be satisfactory.

It will be apparent to those skilled in the art that the illustrated embodiments of the signalling systems of this invention are examples only and that many changes, modifications and deletions may be made without departing from the invention. It is intended in the appended claims, therefore, to cover all such changes, modifications and deletions as fall within the true spirit and scope of the invention.

What I claim as new and desire to secure by Letters Patent of the United States is:

1. A signalling system comprising: operator station means for selecting and transmitting distinctive function command signals each composed of a safety tone signal and a given number of successive control tone signals in a predetermined timed relationship therewith; and remote station means for receiving, selecting and translating said function command signals to provide a preselected one of a plurality of functions in accordance with the received function command signal, said means including;

(a) means for receiving said function command signals and providing an output corresponding to the safety tone and control tones selected at said operator station, (b) means for directing the output of said receiver means to a plurality of separate channels each including frequency selective means adapted to pass only a preselected one of said safety tone and control tone signals so that a safety tone channel and a number of control tone channels are provided;

(c) output means associated with each of said separate channels;

(d) means associated with said safety tone channel arranged to cause the output means thereof to remain energized for a predetermined time period after its initial energization resulting from application of the safety tone to said safety tone channel;

(e) storage means, one associated with each of said control tone channels;

(f) and means responsive to said safety tone for controlling each of said storage means so that the presence of the control tone signal assigned to a given control tone channel is operative to allow the output means thereof to assume its energized condition.

2. The signalling system of claim 1 wherein said storage means is controlled by the output of a monostable circuit means arranged to be triggered by said safety tone.

3. The signalling system of claim 2 wherein said storage means includes first and second bi-stable circuit means arranged so that the output of said monostable circuit means provides a shifting pulse to cause said second bi-stable circuit means to assume the state of said first bi-stable circuit means.

4. The signalling system of claim 2 wherein said storage means is arranged to be clamped in an inactive condition upon de-energization of the output means of said safety tone channel.

5. The signalling system of claim 3 wherein said first and second bi-stable circuit means are arranged to be clamped in an inactive condition upon de-energization of the output means of said safety tone channel.

6. The signalling system of claim 1 wherein said operator station means comprises:

(a) a source of carrier frequency oscillations;

(b) a source of sub-carrier frequency oscillations providing a plurality of distinctive tone signals one of which constitutes a safety tone signal and the remainder control tone signals;

(c) timing means for producing a number of outputs in a particular timed relationship;

(d) means controlled by a preselected one of the outputs of said timing means for causing said safety tone signal to modulate said carrier frequency whenever said timing circuit is operative;

(e) and selector means operable to cause selected of the remaining tone signals to modulate said carrier frequency one after the other in a timed relationship controlled by the remaining outputs of said timing means so that said selected tones and said safety tone modulate said carrier frequency in a particular timed relationship to provide a complete function command signal.

7. The signalling system of claim 6 wherein said timing means is a ring circuit.

8. The signalling system of claim 6 wherein said source of subcarrier frequency oscillations comprises a plurality of separate audio tone oscillators each having a gate means associated therewith, said gate means being arranged to be enabled to cause a particular audio tone to modulate said carrier frequency oscillations upon the coincident presence of that particular audio tone and a selected output of said timing means.

9. The signalling system of claim 7 wherein said timing means is a ring circuit comprising a number of monostable multivibrator circuits.

10. The signalling system of claim 7 wherein said selector means comprises a plurality of switching means each arranged when actuated to selectively connect all except one of the outputs of said timing means to said gate means so that those gate means are enabled to allow the audio tones with which they are associated to modulate said carrier frequency oscillations one after the other under the control of said timing means.

11. In a remote control system for vehicles wherein a selected one of a plurality of different operating functions are to be performed in response to different function command signals transmitted to said vehicle, the combination comprising:

operation station means including:

(a) a source of carrier frequency oscillations, (b) a source of sub-carrier frequency oscillations providing a plurality of distinctive tone signals one of which constitutes a safety tone signal and the remainder control tone signals, (c) timing means for producing a number of outputs in a particular timed relationship, (d) means controlled by a preselected one of the outptuts of said timing means for causing said safety tone signal to modulate said carrier frequency whenever said timing circuit is operative, (e) and selector means operable to cause selected of the remaining tone signals to modulate said carrier frequency one after the other in a timed relationship controlled by the remaining outputs of said timing means so that said selected tones and said safety tone modulate said carrier frequency in a particular timed relationship to provide a complete function command signal, and remote station means associated with said vehicle including:

(a) means for receiving said function command signals and providing an output corresponding to the safety tone and the control tone selected at said operator station, (b) means for directing the output of said receiver means to a plurality of separate channels each including frequency selective means adapted to pass only a preselected one of said safety tone and control tone signals so that a safety tone channel and a number of control tone channels are provided, (c) output means associated with each of said separate channels, (d) means associated with said safety tone channel arranged to cause the output means thereof to remain energized for a predetermined time period after its initial energization resulting from application of the safety tone to said safety tone channel, (e) a plurality of storage means, one associated with each of said control tone channels, (f) and means responsive to said safety tone for controlling each of said storage means so that the presence of the control tone signal assigned to a given control tone channel is operative to allow the output means thereof to assume its energized condition.

12. A signalling system for remotely controlling the operation of a vehicle comprising:

Operator station means for transmitting distinctive function command signals each composed of a safety tone signal and a given number of successive control tone signals in a predetermined timed relationship therewith, said means including (a) a source of carrier frequency, (b) means for generating a plurality of separate sub-carrier frequency tone signals one of which represents a safety tone signal and the others control tone signals, (c) timing means for producing a given number of time-spaced output pulses in a predetermined time period, (d) means controlled by a preselected one of the output pulses of said timing means for causing said safety tone signal to modulate said carrier frequency, (e) and control function selector means operable to cause selected of the remaining tone signals to modulate said carrier frequency one after the other in a timed relationship controlled by the remaining output pulses of said timing means to provide a function command signal in the form of a carrier frequency signal modulated by a safety tone signal and at least one control tone signal in a timed relation controlled by said timing means and within the predetermined time period thereof, And remote station means carried by said vehicle including (a) a plurality of separate utilization devices one associated with each of the separate vehicle functions to be performed, (b) means for receiving and selecting said function command signals and for demodulating them to remove said carrier frequency, (c) means for directing said demodulated signals to selected of a plurality of separate channels in accordance with the frequencies of the detected signals, said channels being arranged to provide a safety tone channel and a number of control tone channels, said safety tone channel including, (1) means for deriving a trigger pulse from the safety tone frequency applied at the input of said channel, (2) bi-stable circuit means arranged to be driven between its two stable states to provide a first and second output pulse in response to the positive and negative going portions, respectively, of said trigger pulse, (3) first and second monostable circuit means arranged to be respectively triggered by the first and second outputs of said bi-stable circuit means, (4) output means, (5) and means coupling the outputs of said first and second monostable circuit means to said output means so that said output means remains energized for a predetermined time;

said control channels each including (1) means for deriving a trigger pulse from the control tone frequency applied at the input of said channel, (2) a first bi-stable circuit means arranged to be driven by said trigger pulse, (3) a second bi-stable circuit means, (4) means responsive to the trigger pulse derived in said safety tone channel for causing said second bi-stable circuit means to assume the state of said first bi-stable circuit means, and (5) output means arranged to be energized by said second bi-stable circuit means;

(d) and means arranged to cause a preselected one of said utilization devices to be actuated when the energized condition is present at the output means of said safety tone channel and at least one control channel at the same time.

13. A signalling system for controlling the operation of a vehicle comprising:

(A) Operator station means for transmitting distinctive function command signals each composed of a safety tone signal and a given number of successive control tone signals in a predetermined timed relationship therewith, said means including;

(a) a source of carrier frequency oscillations, (b) means for generating a plurality of separate sub-carrier frequency tone signals one of which represents a safety tone signal and the others control tone signals, (c) timing means for producing a number of outputs in a particular timed relationship, (d) means controlled by a preselected one of the outputs of said timing means for causing said safety tone signal to modulate said carrier frequency oscillations, and (e) control function selector means operable to cause selected of the remaining tone signals to modulate said carrier frequency one after the other in a timed relationship controlled by the remaining outputs of said timing means, and (B) Remote station means carried by said vehicle including;

(a) a plurality of utilization devices one associated with each of the separate vehicle functions to be operated, (b) means for receiving and selecting said function command signals and for demodulating them to remove said carrier frequency, (c) a plurality of separate channels one corresponding to each of the sub-carrier frequency tone signals generated at said operator station means to provide a safety tone channel and a plurality of control tone channels, (d) means for directing the demodulated output of said received function command signals to said safety tone channel and a given number of separate control tone channels in accordance with the particular tone signals making up a given function command signal, (e) output means arranged in said safety tone channel and in each of said control tone channels under control of said safety tone signal adapted to be actuated for a predetermined period in response to the tone signal directed thereto, the output means in said safety tone channel being further arranged to remain energized for a period at least as long as that required for one cycle of outputs to be produced by said timing means, (f) and means arranged to cause a preselected one of said utilization devices to be actuated to provide a desired vehicle function when output means are energized in preselected control tone channels simultaneously within the period during which the device in said safety tone channel is energized.

References Cited

UNITED STATES PATENTS

| | | | |
|---|---|---|---|
| 2,844,650 | 7/1958 | Dutton | 340—171 |
| 2,914,674 | 11/1959 | Barry | 343—228 |
| 3,114,142 | 12/1963 | Bode et al. | 325—55 |
| 3,168,738 | 2/1965 | Curll | 343—228 |
| 3,128,349 | 4/1964 | Boesch et al. | 340—171 |
| 3,160,711 | 12/1964 | Schroeder | 325—55 |
| 3,150,232 | 9/1964 | Schmidt | 340—171 |
| 3,197,563 | 7/1965 | Hamsher et al. | 179—15 |
| 3,239,761 | 3/1966 | Goode | 340—171 |

JOHN W. CALDWELL, *Primary Examiner.*

NEIL C. READ, *Examiner.*

A. J. KASPER, *Assistant Examiner.*